April 13, 1965
L. E. DAVIS
3,177,533
DOOR CONSTRUCTION
Filed May 21, 1962
2 Sheets-Sheet 1
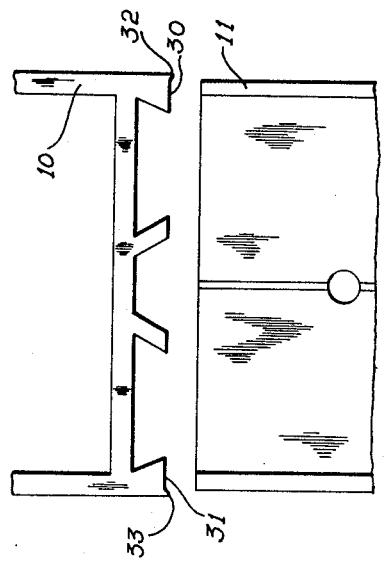
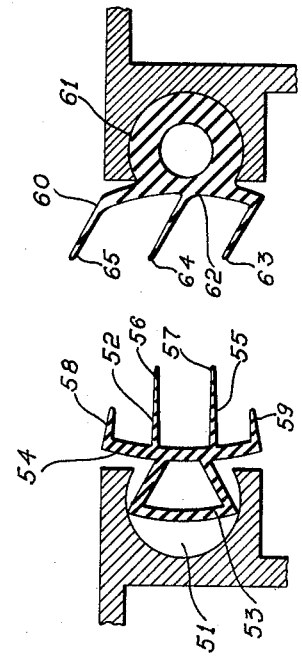
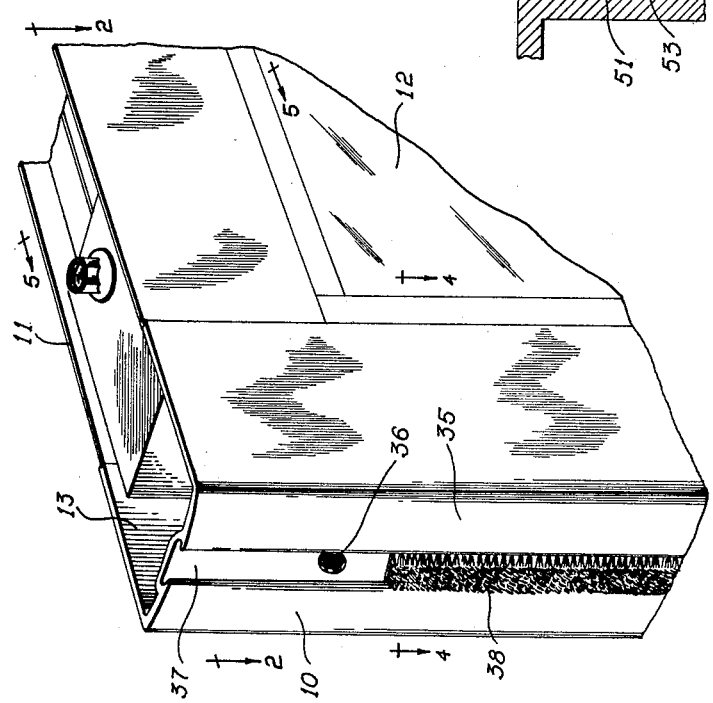
INVENTOR
LAWRENCE E. DAVIS
BY *Irons, Birch, Swindler & McKie*
ATTORNEYS

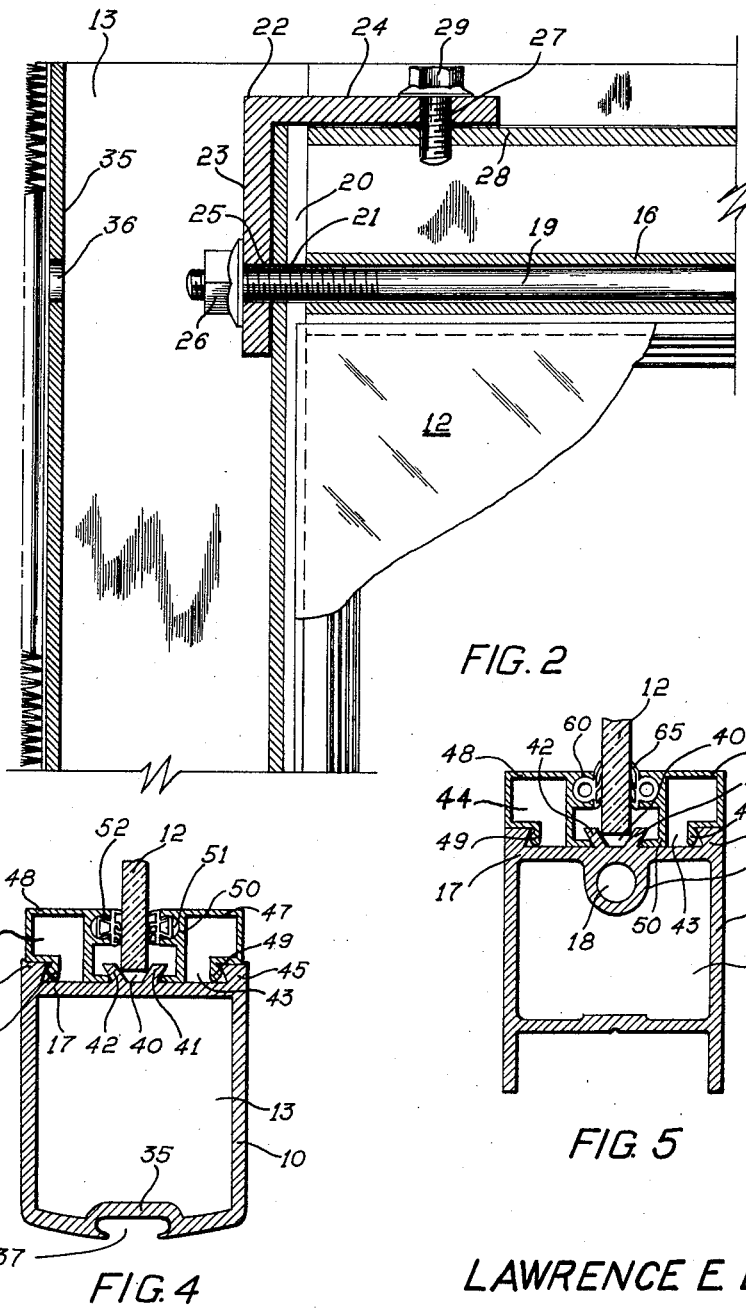

United States Patent Office 3,177,533
Patented Apr. 13, 1965

3,177,533
DOOR CONSTRUCTION
Lawrence E. Davis, Rte. 142, Eldorado, Ill.
Filed May 21, 1962, Ser. No. 196,199
10 Claims. (Cl. 20—35)

This invention relates to door constructions, and more particularly to door constructions embodying vertical stiles and horizontal rails forming a frame for a panel member.

It has now become quite popular to employ combination metal and glass doors particularly for the entrances to commercial establishments. In such doors the metal members form the frame for the glass panel, and the frame is generally of a rather small width, so that the major portion of the door is formed by the glass panel. Extruded aluminum stiles and rails are frequently used to form the frames of such doors, but particularly because of the popular narrow-width frames, it is difficult to form strong joints between the stiles and rails, or at least to form a joint that will be strong enough to withstand the various forces applied to the frame members during use of the door.

It is a particular purpose of this invention to form materially-strengthened joints between the stile and rail members of a door frame. It is a further purpose of the invention to form good weather seals between the members of the door frame and between the frame and the panel member, which will usually be glass.

The invention in its broadest aspects includes the provision of ridges fixed to the rail members and extending longitudinally thereof, such ridges defining holes through which tie rods extend. The tie rods pass through the walls of the associated stiles and are fixed thereto, preferably under tension, so that the ridge and tie rod combination holds the rails against the stiles and forms strong joints therebetween.

It is conventional in this type of door construction to form a weather seal between the frame and the panel member. The present invention further includes a particular configuration of stiles such that the inner walls thereof against which the rails seat are slightly wider than the rails and have projections embracing the rails. Thereby, weather seals are also formed at the joints between the stiles and the rails.

A further feature of the invention resides in the use of snap-in panel stops which bear against the panel member and hold it in position in the frame.

Another feature of the invention consists in the use of an especially-designed weatherstrip seating in a slot in each of said stops and bearing against the panel member to form an extremely good weather seal between the panel member and the frame.

The invention will now be more fully described in conjunction with preferred embodiments thereof shown in the accompanying drawings.

In the drawings:

FIG. 1 is a perspective view of one corner of the door construction;

FIG. 2 is a vertical sectional view taken along line 2—2 of FIG. 1;

FIG. 3 is an expanded plan view of a portion of the construction of FIG. 2, showing the stile and rail separated but adjacent each other to show the greater width of the stile and the projections at the opposite ends of its inner corner;

FIG. 4 is a sectional view taken along line 4—4 of FIG. 1, showing the stile and panel joint;

FIG. 5 is a sectional view taken along line 5—5 of FIG. 1, but showing a different type of weather stripping in the glass stops for the rail and panel joint;

FIG. 6 is a detailed view of a portion of one of the glass stops, showing the type of weather stripping illustrated in FIG. 4; and FIG. 7 is a view similar to FIG. 6 showing the type of weatherstrip illustrated in FIG. 5.

Referring first to FIG. 1, the door construction, as is usual, includes a pair of vertical stiles and a pair of horizontal rails fixed together to form a frame for a panel member. In FIG. 1 only one corner of the door is shown, since the remaining elements are merely duplicates of the stile 10 and rail 11 of that figure. A portion of the glass panel member 12 is also shown in FIG. 1.

As will be evident from FIGS. 1–5, each of the stiles 10 is hollow and has walls defining an enclosed passageway 13 of generally rectangular configuration. Each of the rails 11 is of similar configuration and encloses a passageway 14.

Each of the rails 11 has a ridge 16 extending longitudinally along its inner wall 17 and fixed thereto. This ridge defines an enclosed passage 18 which is preferably of cylindrical shape though it need not be of such shape and in fact need not be completely enclosed. The ridge 16 and its passage 18 extend along the entire length of each rail, and a tie rod 19 extends through each of the passages 18.

The inner wall 20 of each of the stiles 10 has a hole 21 extending therethrough and registering with the passage 18 in the associated ridge 16. Also, at each end of each tie rod there is provided an angle member 22 having a pair of mutually perpendicular legs 23 and 24. The leg 23 extends into the passageway 13 of the stile 10 and has a hole 25 extending through the leg and registering with the ridge passage 18 and the stile hole 21, so that the tie rod 19 may extend therethrough.

A nut 26 having an outer dimension larger than the outer dimensions of the hole 25 is threaded onto the outer end of the tie rod 19 and against the adjacent surface of the leg 23 of the angle member. The tie rod 19 is of course threaded at both ends for engagement with the threads of the nuts 26. The nut 26 is preferably a serrated lock nut and the nut is preferably tightened against the angle leg 23 sufficient that the serrations bite into the angle member, so as to prevent unintentional loosening of the nut.

The other leg 24 of each of the angle members has a bolt 27 extending therethrough and threaded into the outer wall 28 of the cross rail 11. The bolt 27 preferably also has a serrated head 29 which is tightened against the adjacent surface of the angle leg 24, similarly to the lock nut 26, to prevent the bolt from loosening.

It will be apparent that with the nuts 26 tightened on each of the tie rods 19, and with the bolts 27 threaded into the rails 11, the rails are seated firmly against the inner walls of the stiles. By reason of the provision of the ridges 16 in the rails, and the use of the tie rods and nuts placing the tie rods under tension, a very strong bond is formed between the rails and the stiles.

The rails and stiles may be made of extruded metal, such as aluminum, as is common in many commercial doors, and the ridges 16 may of course be formed integral with the rails at the time the rails are extruded. With the integral construction the joints between the rails and stiles are made stronger, so that it is unlikely that the door frame will sag.

To further strengthen the corner joints and to provide a weather seal between the rail and stile of each joint, the stile is made slightly wider than the joint as is shown more clearly in FIG. 3. It is also evident from that figure that the seating surfaces 30 and 31 of the inner wall of each stile have projections 32 and 33 extending from their opposite ends, so that when the rails are tightened against the stiles, the opposite walls of the rails are embraced between the stile projections.

With the projections fitting very closely against the walls of the rails, a good weather seal is formed at the joints, and also the joint is further strengthened against twisting of the rails with respect to the stiles. In one actual embodiment of the invention the projections 32 and 33 extended only approximately 0.02 inch beyond the seating surfaces 31 and 32 of the stiles, while the stiles were themselves only approximately 0.03 inch wider than the corresponding rails. As a result the bond was not evident to the naked eye but was extremely effective for its intended purpose.

It will be evident that it is necessary to drill the holes 21 through the inner walls of the stiles during assemblage of the frame. Since the stiles are preferably of extruded metal and the passages 13 are completely enclosed, it is necessary first to drill a hole through the outer wall 35 of the stile. A desirable feature of the invention is that this hole 36, registering with the subsequently-drilled hole 25, is made in a slot 37 extending along the outer wall of the stile and forming a seat for a removable weatherstrip 38. As a result, after the door is assembled and the weatherstrip is in position, the hole 36 is not visible.

Each of the stiles and rails of the preferred embodiment of the invention has three longitudinal parallel slots extending along its inner walls. The central of these slots 40 is formed by ridges 41 and 42 extending from the wall 17 and integral therewith. This central slot is designed for seating of the edge of the glass panel member 12.

The two outer slots 43 and 44 are formed by the projections 41 and 42, respectively, and opposite ridges 45 and 46. The projecting ridges 45 and 46 converge toward the ridges 41 and 42, respectively, in a direction away from the bottoms of the slots, so that the slots are wider at their innermost portion than at their mouths.

The panel member is shown as retained in position in the frame by a pair of stops 47 and 48, seated in the slots 43 and 44 on each stile and each rail. These stops are preferably of a snap-in configuration and may suitably be of a generally squared G-shaped configuration in cross section, with each stop having a pair of longitudinally-extending feet 49 and 50 extending from the ends of the G-shape. These feet are suitably formed to fit into the slots 43 and 44, with the feet 49 bearing against the projections 45 and the feet 50 bearing against projections 41.

Each of the stops has surfaces opposite the panel member forming a slot 51 extending longitudinally of the slot, for reception of a resilient weatherstrip 52. As is more apparent from FIG. 6, the weatherstrip 52 generally comprises three portions, the first portion 53 being of appropriate shape such as to seat in the slot 51, the second portion 54 being appropriately shaped to lie along the surfaces of the stop opposite the glass panel, and the portion 55 being formed by a plurality of legs extending outwardly from the portion 54. In the weatherstrip of FIG. 6, the leg portion 55 includes a pair of inner parallel legs 56 and 57 which extend generally perpendicular to the stop and therefore substantially perpendicular to the portion 54 of the strip. The portion 55 further includes a pair of outer legs 58 and 59 which extend slightly toward each other from the outer ends of the portion 54.

In use of the weatherstrip 52 of FIG. 6 (see FIG. 5), the strip is first seated in the slot 51 in the panel member stop, the foot 50 is then positioned in the slot 43 in the inner wall of the stile or rail with the foot adjacent ridge 41 and the stop tilted with respect to the panel member 12. The stop is then pressed outwardly to cause the foot 49 to snap under the wall of the projecting ridge 45. Since the stops are of metal with the legs extending from the ends of the generally G-shape, and since the configuration is preferably somewhat compressible, the stops may readily be snapped into place and will then hold the glass panel member in position.

With the weatherstrip shown in FIGS. 4 and 6, the legs of the third portion 55 thereof may be compressed during the snapping-in operation to lie in various directions along the glass panel. To provide a better seal and also a more eye-pleasing construction, the weatherstrip 60 of FIGS. 5 and 7 is preferably used.

Referring particularly to FIG. 7, it will be seen that the strip 60 is composed of a generally cylindrical portion 61 which seats in the slot formed in the stop, a portion 62 which extends outward from the portion 61 and lies along the surfaces of the stop opposite the panel member, and three legs 63–65 which extend at an angle other than the perpendicular from the portion 62. In other words, these legs are sloped generally toward the center of the panel member, so that (referring to FIG. 5) the legs are all extended in one direction when the stop is snapped into position. Also, the outer leg shown at 65 in FIG. 5 will form what might be termed a fillet between the strip and the panel member. This configuration results in an eye-pleasing construction and also, as will be apparent, provides a better seal against weather than the configuration of FIG. 6.

It will be understood that the embodiments particularly described in conjunction with the drawings are not essential in all detail to the present invention. While the construction of the invention is particularly designed for use with extruded metal doors, the construction could also be usefully employed with doors made of other materials. Also the particular configurations of the various elements of the door construction are not essential to the invention, though they are preferred. Further, the angle members shown need not actually be used in all four corner joints of the door particularly where an offset pivot hinge construction is desirable. In such construction the pivot hinges might be fixed to the door by flat plates which would then be in the way of angle plates. Flat plates, rather than angle plates, could then be used to secure the stile and rail members together.

Even further, it will be understood that, particularly with very wide doors, it may be desirable to use two or more tie bolts for each rail, to form even stronger joints between the stiles and rails.

It will be understood therefore that the invention is not to be considered limited to the particular embodiments described herein, but rather only by the scope of the appended claims.

I claim:

1. In a door construction including a pair of vertical stiles and a pair of horizontal rails forming a frame for a panel member, a ridge fixed to each of said rails and extending continuously from one end to the other thereof, said ridge defining an internal tie rod passage, a tie rod extending through each of said passages and fastened at its opposite ends to the respective stiles to form strong joints between the stiles and rails, said stiles each being hollow with their walls defining substantially rectangular cross section passageways extending longitudinally thereof, an angle member for each end of each tie rod having two mutually perpendicular legs, one leg of each angle member extending into the passageway of its respective stile and the other end extending along the adjacent horizontal rail, each angle member having a tie rod hole extending through said one leg thereof, each of said stiles also having tie rod holes through their inner walls aligned with the respective tie rod passages in said ridges and the respective tie rod holes in said angle members, said one legs of said angle members being in contact with said inner walls of the stiles, said tie rods being threaded at each of their ends and extending through the respective tie rod holes, and a nut for each end of each tie rod having an outer dimension larger than the outer dimensions of the tie rod holes and engaging each threaded end of each tie rod and bearing closely against the respective angle member to place the tie rods under tension and thereby strengthen the corner joints between stiles and rails.

2. The apparatus of claim 1 in which said other legs of the angle members are fastened to the respective adjacent rails.

3. The apparatus of claim 1 in which each of said stiles has an inner wall against which the rails seat,
said inner walls being slightly wider than the rails and terminating in outer integral short projections extending along and from their opposite ends to embrace the walls of the rails to form a weather seal therewith and to resist twisting of the stiles with respect to the rails.

4. The apparatus of claim 1 in which the inner wall of each of said stiles and each of said rails has three parallel slots extending longitudinally therealong, the central slot being for reception of the panel member,
and a panel member stop in each of the outer slots extending along their lengths and having inner surfaces bearing against the panel member to hold it fixed in position,
each of said outer slots being defined by a pair of outstanding ridges having inner walls converging toward each other in a direction away from the innermost portion of the slot,
and each of said panel member stops having a pair of longitudinally-extending feet lying in its respective slot and bearing against said inner walls of the ridges adjacent the innermost surfaces thereof.

5. The apparatus of claim 4 in which each of said panel member stops is a single metal piece of a generally G-shaped cross section with said feet extending from the terminal ends of the G-shape and having remote surfaces apart by a distance substantially the same as the width of the corresponding outer slot at its bottom, so that the stops may be snapped into their slots with the panel member in its slots, to hold the panel member in position.

6. The apparatus of claim 5 in which each of said panel member stops has surfaces defining a slot extending along the upper face of its G-shape,
and a weatherstrip positioned in each stop slot and extending outward therefrom to bear against the panel member and form a weather seal therewith.

7. The apparatus of claim 1 in which each of said stiles and rails has inward-facing wall surfaces defining a pair of parallel slots extending therealong between which the panel member may be positioned,
a snap-in panel member stop in each of said slots operable to bear against the panel member to support it in position, each of said stops having surfaces defining a longitudinal slot having its mouth adjacent the panel member,
and a weatherstrip in each of said stop slots for bearing against the panel member to form a weatherseal therewith,
each of said weatherstrips being entirely of resilient material and having
a first longitudinally extending portion lying in said slot of its stop,
a second longitudinally-extending portion fixed to the first portion of the weatherstrip and lying against the surfaces of the stop immediately adjacent said slot,
and a plurality of longitudinally-extending substantially parallel legs each extending outwardly from said second portion of the weatherstrip at an angle to the perpendicular thereto.

8. In a door construction including a pair of extruded metal vertical stiles and a pair of extruded metal horizontal rails together forming a frame for a glass panel, each of said stiles and rails having longitudinally-extending walls defining substantially rectangular passageways internally thereof,
a ridge fixed to one wall of each of said rails and extending longitudinally of said passageway thereof, each said ridge defining an inner enclosed passage extending between opposite ends of the associated passageway,
a metal tie rod extending through each of said passages,
each stile having holes through its inner wall aligned with the passages through said ridges, said tie rods extending through said holes and being threaded at opposite ends,
a metal angle member for each end of each tie rod having two mutually perpendicular legs, one of which has a bolt hole extending therethrough, said one leg of each angle member extending into the passageway of its respective stile with its bolt hole aligned with the corresponding hole through the stile wall and the corresponding threaded end of the tie rod extending therethrough,
a nut for each end of each tie rod having an outer dimension larger than the outer dimensions of the associated angle leg hole and threaded on each threaded edge of each tie rod,
said nut bearing tightly against the associated angle leg to form strong joints between the stiles and rails,
the other leg of each angle member extending along the adjacent outer wall of the associated rail and fixed thereto.

9. The apparatus of claim 8 in which said inner walls of the stiles are slightly wider than the rails and terminate in outer integral short projections extending from and along their opposite ends to form a seat for the outer walls of the respective rails, said projections abutting the outer walls of the rails to form weatherproof seals therewith and to resist twisting of the stiles with respect to the rails.

10. The apparatus of claim 5 in which said inner walls of the stiles and the corresponding inner walls of the rails each are formed to have three parallel slots extending longitudinally thereof, the central slot being for reception of the glass panel,
a snap-in metal stop in each of the outer slots extending along their length and having inner surfaces opposite the glass panel to hold it fixed in position,
each of said metal stops having surfaces defining a slot extending along its inner wall,
and a resilient weatherstrip positioned in each said stop slot and extending outward therefrom to bear against the glass panel and form a weather seal therewith.

References Cited by the Examiner

UNITED STATES PATENTS

| | | | |
|---|---|---|---|
| 1,799,423 | 4/31 | Hubbert | 189—46 |
| 2,147,209 | 2/39 | Olson | 151—37 |
| 2,230,303 | 2/41 | Leguillon | 20—69 X |
| 2,605,869 | 8/52 | Backman | 189—46 X |
| 2,611,633 | 9/52 | Webster | 189—36 X |
| 2,682,325 | 6/54 | Mitchell et al. | 189—46 |
| 2,706,543 | 4/55 | Kammerer | 189—46 |
| 2,871,524 | 2/59 | Wille et al. | 20—56.4 |
| 2,918,708 | 12/59 | Sharp et al. | 20—35 |
| 2,930,086 | 3/60 | Griffiths | 20—16 |
| 2,931,434 | 4/60 | Steel | 160—91 |
| 2,970,397 | 2/61 | Roseman | 20—56.4 |
| 2,971,229 | 2/61 | May | 20—56.4 |

HARRISON R. MOSELEY, *Primary Examiner.*
N. ANSHER, *Examiner.*